United States Patent Office 2,924,516
Patented Feb. 9, 1960

2,924,516
HERBICIDAL COMPOSITIONS

François D'Ogny, Paris, France, assignor to Pechiney Compagnie de Produits Chimiques et Electrometallurgiques No Drawing. Application July 5, 1956
Serial No. 595,825

Claims priority, application France July 12, 1955

6 Claims. (Cl. 71—2.2)

This invention relates to a new herbicide for the killing of vegetation in general, suitable for use in complete clearing of fields, the killing of undergrowth, couch grass, brambles and the like, and for the topping of potato plants. The invention may be considered also to include a process for increasing the herbicidal qualities of sodium chlorate and to include a new process for the destruction of vegetation effected by the action of a new herbicidal composition.

It is known that sodium chlorate is effective for the above mentioned purposes but its use in required amounts is accompanied by a number of undesirable results. The elimination of the residual chlorate and of its by-products incidental to decomposition occurs slowly after the chlorate has been spread over the soil containing the destroyed vegetation, and as a consequence, there is a danger that the lingering chlorate will have a harmful effect upon crops or other items planted on such soil after the disappearance of the killed vegetation. This danger of subsequent harmful effects has constituted a deterrent to the free use of the chlorate for the stated purposes.

An object of the present invention is to provide a herbicide not subject to the foregoing danger with some crops, or not to anywhere near the same degree of danger with other crops.

Another object of the invention is to provide a herbicidal composition which is effective upon certain vegetal species which are quite resistant to the action of sodium chlorate.

The herbicidal compositions of the present invention are composed essentially of a mixture of sodium chlorate and sodium fluoride. The effectiveness of the mixture in the killing of weeds and other vegetation is superior to the combined action of each of the component parts used alone, for that of each is reinforced synergistically by the presence of the other.

The relative proportion of sodium chlorate and sodium fluoride may vary to a rather large degree. Any appreciable amount of sodium fluoride will enhance the action of the sodium chlorate. Mixtures of chlorate and fluoride of from 100–15 to 100–100, or more by weight, can be effectively employed, but a controlled study has revealed that the proportions offering maximum effectiveness at minimum cost consist of about 5 parts of sodium chlorate for each 1 part of sodium fluoride.

The herbicidal compositions of the present invention offer a number of advantages over sodium chlorate alone. To accomplish the same amount of destruction, the quantity of the composition of the present invention required is much less than the amount of sodium chlorate required if used alone. The residual harmful effect in the soil upon future crops planted in the treated areas is substantially lessened. Since the quantity of chlorate utilized in the compositions of the present invention is substantially less than when the chlorate is used alone, the employment of the chlorate-fluoride mixture is economically very advantageous, even though the cost of the fluoride is higher than that of the chlorate. Finally, the herbicidal compositions of the invention are effective in killing vegetation resistant to the chlorate alone, such as ferns for example.

Example 1

In a field infested with couch grass, a mixture of 100 kgs. of sodium chlorate and 20 kgs. of sodium fluoride per hectare was applied. The grass was completely killed within a short time. In a similar field covered with this gramineous growth the complete destruction required a concentration of 300 kgs. of sodium chlorate alone, and the action was slower.

Example 2

Potato plants in a measured area were topped by the application of a herbicidal composition containing 20 kgs. of sodium chlorate mixed with 4 kgs. of sodium fluoride per hectare. To accomplish the same result on a comparable area using sodium chlorate alone, it was necessary to employ 40 kgs.

Example 3

A small parcel of land covered with ferns was treated with a mixture of 25 kgs. of sodium chlorate and 5 kgs. of sodium fluoride per hectare and 90% destruction was obtained in nine days. On a like area covered with the ferns, it was determined that a treatment with sodium chlorate alone at the rate of 100 kgs. per hectare accomplished only 75% destruction of the ferns in the same period.

Example 4

A spring growth of broom weeds was treated and killed by spreading a mixture of 50 kgs. of sodium chlorate and 10 kgs. of sodium fluoride per hectare. To obtain the same result 200 kgs. of sodium chlorate alone was required per hectare.

In the foregoing examples the cost of effecting the same or superior herbicidal results was reduced by from 25% to 50% through utilization of the compositions of the present invention in place of sodium chlorate alone. Furthermore, when crops were planted several months later on the land treated under the foregoing examples, the soil on which the compositions of the present invention were applied showed less harmful effects to subsequent crops. The disappearance of the harmful effects was both more complete and more rapid.

The compositions of the present invention may be supplemented by the addition of various ingredients without departing from the concepts of the present invention, such ingredients being other weed killing agents, additives designed to reduce the danger of fire such as borax, loading substances, and others.

I claim:

1. A herbicidal composition comprising a herbicidal amount of sodium chlorate and a synergistic amount of sodium fluoride.

2. A herbicidal composition comprising sodium chlorate and sodium fluoride in weight ratio from 100:15 to 100:100.

3. A herbicidal composition comprising sodium chlorate and sodium fluoride in the approximate weight ratio of 5 to 1.

4. A process for the destruction of vegetation which comprises applying thereto a herbicidal amount of a mixture of sodium chlorate and sodium fluoride in the approximate weight ratio of 5 to 1.

5. A herbicidal composition comprising sodium chlorate and sodium fluoride, the latter being present in an amount which enhances the herbicidal power of the former and which is not substantially less than about 15 parts to each 100 parts of the former by weight.

6. A process for the destruction of vegetation which comprises applying thereto a mixture of sodium chlorate and a synergistic amount of sodium fluoride in an amount which destroys the vegetation.

References Cited in the file of this patent

UNITED STATES PATENTS

| | | |
|---|---|---|
| 1,925,628 | Chipman | Sept. 9, 1933 |
| 2,690,387 | O'Brien et al. | Sept. 28, 1954 |

FOREIGN PATENTS

| | | |
|---|---|---|
| 595,010 | France | July 7, 1925 |
| 622,405 | France | Feb. 26, 1927 |
| 753,684 | France | Oct. 16, 1933 |

OTHER REFERENCES

Notes, in "Journal of American Society of Agronomy," vol. 33, No. 4, April 1941.